(12) United States Patent
Budhia et al.

(10) Patent No.: US 10,720,277 B2
(45) Date of Patent: Jul. 21, 2020

(54) FERRITE ARRANGEMENT IN A WIRELESS POWER-TRANSFER STRUCTURE TO MITIGATE DIMENSIONAL TOLERANCE EFFECTS ON PERFORMANCE

(71) Applicant: WiTricity Corporation, Watertown, MA (US)

(72) Inventors: Mickel Bipin Budhia, Auckland (NZ); Chang-Yu Huang, Auckland (NZ); Nicholas Athol Keeling, Munich (DE); Michael Le Gallais Kissin, Auckland (NZ)

(73) Assignee: WiTricity Corporation, Watertown, MA (US)

( * ) Notice: Subject to any disclaimer, the term of this patent is extended or adjusted under 35 U.S.C. 154(b) by 77 days.

(21) Appl. No.: 15/700,004

(22) Filed: Sep. 8, 2017

(65) Prior Publication Data

US 2019/0080840 A1    Mar. 14, 2019

(51) Int. Cl.
*H01F 38/14* (2006.01)
*H02J 50/12* (2016.01)
(Continued)

(52) U.S. Cl.
CPC .............. *H01F 38/14* (2013.01); *B60L 53/12* (2019.02); *H01F 27/365* (2013.01); *H01F 41/04* (2013.01); *H02J 7/025* (2013.01); *H02J 50/12* (2016.02)

(58) Field of Classification Search
CPC .. H02J 50/10; H02J 50/12; H02J 50/40; H02J 5/05; H02J 50/60; H02J 50/70;
(Continued)

(56) References Cited

U.S. PATENT DOCUMENTS

| | | | |
|---|---|---|---|
| 2009/0213557 A1* | 8/2009 | Wen | H04R 1/406 |
| | | | 361/748 |
| 2010/0320843 A1 | 12/2010 | Kitamura et al. | |
| 2013/0181667 A1* | 7/2013 | Takeshita | H01F 38/14 |
| | | | 320/108 |

(Continued)

FOREIGN PATENT DOCUMENTS

| | | |
|---|---|---|
| KR | 20160144042 A | 12/2016 |
| WO | 2014011059 A1 | 1/2014 |

*Primary Examiner* — Richard Isla
*Assistant Examiner* — Michael N DiBenedetto
(74) *Attorney, Agent, or Firm* — Colby Nipper PLLC

(57) ABSTRACT

Systems and methods are described for a ferrite arrangement that mitigates dimensional-tolerance effects on performance of a wireless charging pad, such as a WEVC pad. These systems and methods include a power-transfer structure having ferrite bars arranged to form ferrite strips in a staggered pattern to provide a path for magnetic flux induced by a magnetic field. The staggered pattern includes a series of ferrite strips that alternate defined starting-point locations at opposing sides of the power-transfer structure. Ending-point locations of the ferrite strips are not defined, but are based on an accumulation of lengthwise dimensional tolerances of the ferrite bars used to form the ferrite strips. Using the staggered pattern in a base power-transfer structure defines a coupling range for coupling with a vehicle power-transfer structure and a range limit for associated magnetic field emissions by the base power-transfer structure.

29 Claims, 10 Drawing Sheets

(51) Int. Cl.
H01F 41/04 (2006.01)
H02J 7/02 (2016.01)
B60L 53/12 (2019.01)
H01F 27/36 (2006.01)

(58) Field of Classification Search
CPC .. H02J 50/80; H02J 50/90; H02J 50/50; H02J 7/025; H01F 38/14; H01F 41/04; H01F 27/365; B60L 53/12
USPC .......................................................... 320/108
See application file for complete search history.

(56) References Cited

U.S. PATENT DOCUMENTS

| | | | | |
|---|---|---|---|---|
| 2014/0327394 A1* | 11/2014 | Asselin | ..................... | H01F 3/10 320/108 |
| 2015/0170833 A1* | 6/2015 | Widmer | ................... | H02J 50/80 307/104 |
| 2015/0236513 A1* | 8/2015 | Covic | ..................... | H02J 7/025 307/104 |
| 2015/0298561 A1* | 10/2015 | Keeling | ................. | B60M 7/003 191/10 |
| 2015/0367739 A1* | 12/2015 | Boser | ..................... | H01F 38/14 320/108 |
| 2016/0181819 A1* | 6/2016 | Kautz | ..................... | B60L 53/20 320/108 |
| 2016/0190814 A1* | 6/2016 | Budhia | ................... | H02J 5/005 307/104 |
| 2016/0380469 A1* | 12/2016 | Lethellier | ............... | H02J 7/025 320/108 |
| 2018/0025839 A1* | 1/2018 | Woronowicz | ........... | H01F 41/04 307/104 |
| 2018/0174745 A1* | 6/2018 | Percebon | .............. | H01F 27/365 |

* cited by examiner

FERRITE ARRANGEMENT IN A WIRELESS POWER-TRANSFER STRUCTURE TO MITIGATE DIMENSIONAL TOLERANCE EFFECTS ON PERFORMANCE

FIELD

The present disclosure relates generally to wireless power transfer, and more specifically to wireless electric vehicle charging (WEVC) systems.

BACKGROUND

Wireless power transfer is the transmission of electrical energy from a power source to an electrical load without the use of conductors, such as interconnecting wires. Wireless power is a generic term that refers to a number of different power transmission technologies that use time-varying electric, magnetic, or electromagnetic fields. In wireless power transfer, a wireless transmitter connected to a power source transmits field energy across an intervening space to one or more receivers, where it is converted back to an electric current and then used. Wireless transmission is useful to power electrical devices in cases where interconnecting wires are inconvenient, hazardous, or are not possible. However, current wireless power transfer systems suffer from inefficiencies related to dimensional-tolerance effects on performance.

SUMMARY

Systems and methods are described to mitigate effects of dimensional tolerances on performance of a wireless power-transfer structure. These systems and methods utilize a ferrite arrangement in a wireless power-transfer structure, such as a wireless electric vehicle charging (WEVC) pad used for wirelessly charging an electric vehicle. Aspects include a wireless power-transfer structure including one or more coils that generate a magnetic field. The power-transfer structure includes ferrite strips having varying lengths relative to one another. In an example, the ferrite strips are bounded by a first side and a second side opposite the first side. The ferrite strips are arranged in a staggered pattern including a first strip having a first starting point defined at the first side and a second strip having a second starting point defined at the second side, and the second strip is disposed adjacent to the first strip.

In other aspects, a power-transfer apparatus includes a coil layer configured to generate a magnetic field based on an electrical current running through the coil layer. The power-transfer apparatus further includes a ferrite layer coupled to the coil layer and configured to provide a path for magnetic flux of the magnetic field. The ferrite layer includes a series of ferrite strips having varying lengths and having a starting-point location of each successive ferrite strip from an outer ferrite strip to an inner ferrite strip alternating at opposing sides of the ferrite layer.

In still other aspects, methods for building a power-transfer structure that mitigates dimensional-tolerance effects on performance are described. A first ferrite strip of the power-transfer structure is formed based on a first subset of ferrite bars disposed along a longitudinal axis of the first ferrite strip. The first ferrite strip begins at a predefined starting-point location corresponding to a first side of the power-transfer structure, and ends at an ending-point location based on an accumulation of lengthwise dimensional tolerances of the first subset of ferrite bars. A second ferrite strip of the power-transfer structure is formed based on a second subset of the ferrite bars disposed along a longitudinal axis of the second ferrite strip. The second ferrite strip begins at a predefined starting-point location corresponding to a second side of the power-transfer structure that is opposite the first side, and ends at an ending-point location that is based on an accumulation of lengthwise dimensional tolerances of the second subset of the ferrite bars. The second ferrite strip is adjacent to the first ferrite strip. The power-transfer structure is built based on at least the first ferrite strip and the second ferrite strip to provide a path for magnetic flux of a magnetic field.

In yet other aspects, a wireless power-transfer apparatus that mitigates ferrite dimensional-tolerance effects on performance is described. The apparatus includes one or more coils configured to generate a magnetic field based on an electrical current running through the one or more coils. The apparatus also includes a channeling means for channeling magnetic flux induced by the magnetic field. The channeling means comprises elements arranged in a staggered pattern including a first element having a first starting point defined at a first side and a second element having a second starting point defined at a second side. Further, the second element is disposed adjacent to the first element.

DETAILED DESCRIPTION

Figure 1:
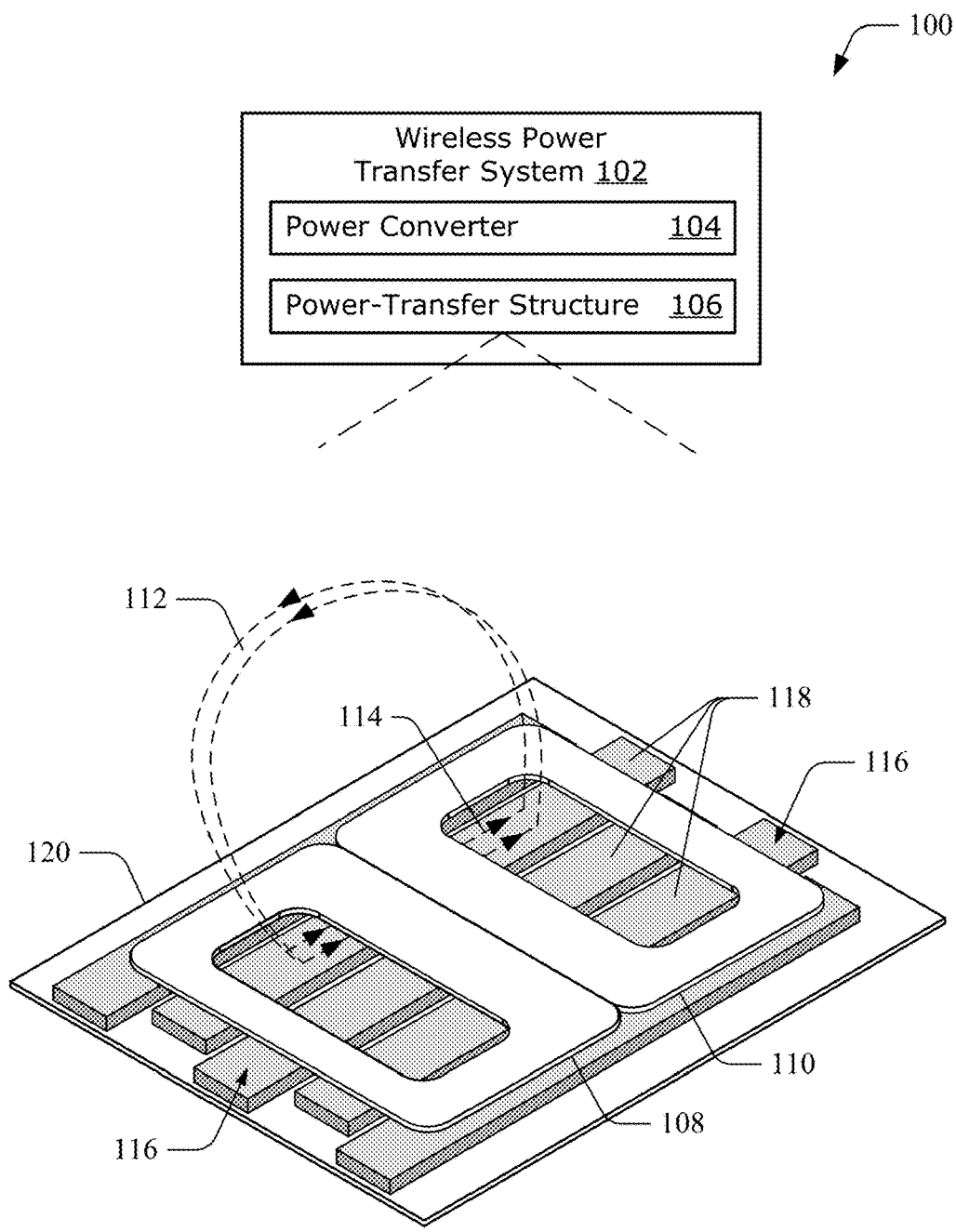
FIG. 1 illustrates an example implementation of a wireless power transfer system.

Wirelessly transferring power involves transferring energy through electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiver element" to achieve power transfer.

Ferrite, a magnetic material with relatively poor conductivity, can be used as a means for channeling magnetic flux of a magnetic field in a WEVC system to enable the magnetic flux to be converted into electrical power. In a power-transfer structure, such as an inductive power transfer pad, referred to herein as a "base pad" or a "vehicle pad," ferrite is generally formed as bars having relatively large dimensional tolerances due to a manufacturing process that involves pressing and sintering. Accordingly, structures formed from a plurality of ferrite bars arranged in long strips can be affected by differences in critical dimensions, such as length. Such variations in critical dimensions can affect performance and produce unpredictable results. Some examples include variations in output power, an undesired range of magnetic field emissions, or an inefficient power coupling between a base pad and a vehicle pad. To address some of these issues, techniques use a grinding process to grind some of the ferrite bars to customized sizes with fine tolerances. This, however, adds complexity and requires additional cost (e.g., monetary cost, material cost), effort, and time.

The techniques described in this document mitigate negative effects that dimensional tolerances of ferrite have on the performance of the WEVC pad. Because ferrite bars are arranged to form ferrite strips, a lengthwise dimensional tolerance of a ferrite strip is a function of the lengthwise dimensional tolerance of a ferrite bar multiplied by the number of ferrite bars included in the ferrite strip. Accordingly, the longer the strip, the greater the variability in the length of the strip. Generally, pad length is defined by the length of the strip. Mitigating the effect of dimensional tolerances of the ferrite bars on the performance of the wireless charging pad results in less variation in output power caused by the ferrite bar tolerances, more output power for a same amount of ferrite, and easier assembly of the pad.

Aspects include a staggered arrangement of ferrite strips of a wireless power-transfer structure, such as a wireless charging pad. The staggered arrangement defines starting-point locations of successive strips alternating at opposing sides of the pad. For instance, a first strip has a defined starting-point location at a first side of the pad, whereas a second strip, which is adjacent to the first strip, has a starting-point location at a second side of the pad opposite the first side. Each strip includes an ending-point location that is not predefined due to the variability in dimensional tolerances of the ferrite bars. Consequently, the ending-point location of a target strip is unknown prior to construction of the target strip. Performance effects resulting from the ending-point location of the target strip, however, are mitigated by the defined starting-point location of each strip adjacent to the target strip.

FIG. 1 illustrates an example implementation 100 of a wireless power transfer system 102. The wireless power transfer system 102 transfers energy from a power source to a remote system. The wireless power transfer system 102 includes a power converter 104 and a power-transfer structure 106. The power converter 104 converts power from a power source to a suitable operating frequency for wireless high-power transfer via the power-transfer structure 106, or to convert power received via the power-transfer structure 106 into a suitable voltage level of a load, e.g., battery.

The power-transfer structure 106 (also referred to herein as a "pad") wirelessly transmits or receives power. The power-transfer structure 106 can include a combination of at least a coil, a ferrite layer, and a backplate. In some aspects, the power-transfer structure 106 can also include a housing to house the coil, the ferrite layer, and the backplate. In the illustrated example, the power-transfer structure 106 includes a Double-D (DD) topology, which includes two electrically conductive coils 108, 110 disposed proximate to one another. The coils 108, 110 are configured to generate a magnetic field 112 by running current through the coils 108, 110. Generally, the current in the center of the pad runs in the same direction. For example, the current in the coil 108 may run in a clockwise direction while the current in the coil 110 may run in a counterclockwise direction. In this way, a high magnetic field strength is generated in the center of the pad (e.g., may arch in a horizontal direction between the poles/openings above the pad). While the power-transfer structure 106 is shown as including separate coils, DD coil topologies can include two separate conductors or a single conductor wound to form a DD coil topology (e.g., as described with respect to FIG. 8), and multiple turns are contemplated in various applications. Other coil topologies are also applicable to the techniques described herein, including a multi-coil topology (e.g., Bi-Polar, Double-D Quadrature (DDQ)) or a single coil topology (e.g., circular coil).

Generally, magnetic flux 114 induced by the magnetic field passes through ferrite 116 disposed proximate to the coils. In the illustrated example, the magnetic flux 114 passing through the ferrite 116 is substantially orthogonal to the coils 108, 110 in the center of the pad, resulting in the flux 114 passing in a straight line through the length of the pad. In an ideal case, a monolithic ferrite slab (100% of volume is used for ferrite) would be used. However it may not be practical to make or use such slabs in large sizes (e.g., for vehicles) using current manufacturing techniques or due to cost. For example, ferrite is generally produced using a process that involves sintering, e.g., compacting and forming a solid mass of material by heat or pressure without melting it to the point of liquefaction. Through the sintering process, however, the ferrite can shrink unevenly, creating challenges with respect to manufacturing tolerances, such as dimensional tolerances including length, width, height, or thickness. Further, ferrite is a brittle ceramic material, which is susceptible to cracking when exposed to bending stresses, such as those caused by vibration.

Because monolithic slabs are not practical, the ferrite 116 can be formed in pieces that are tightly packed together into bars, which are arranged into strips 118. The strips 118 are arranged in a direction relative to a polarization between the poles of the DD coil structure. To facilitate this ferrite arrangement, the strips are positioned substantially parallel to the magnetic field generated by the coils 108, 110 to channel the flux such that flux lines pass lengthwise along the strips 118. Because each individual strip is formed via the sintering process, they are not all equal in length. Rather, some bars may shrink more than others, resulting in a shorter strip that leaves a space between the end of the strip and the side of the pad. While additional ferrite 116 can be ground to fit in the space, grinding adds cost to the manufacturing process and leaving the gap can have a significant effect.

When assembling the power-transfer structure 106, the ferrite bars are placed into a slot in a holder, such as a housing, to form a strip. The slot may be filled with the ferrite bars until no more bars fit, and because of the variability in tolerances of the ferrite bars, a space remains in the slot at the end of the strip. The space is measured, and a ferrite bar is cut to size to fit tightly into the space. In large quantity production, however, these extra steps of measuring, cutting, and fitting can incur additional costs, including monetary, material, and time costs. As further described below, however, assembling the pad based on starting-point locations of successive strips alternating sides of the pad, without the additional steps of measuring, cutting, and fitting a small ferrite bar into the remaining space, improves upon the techniques that require those additional operations. Accordingly, money, material, and time can be saved using the improved techniques described herein.

The starting-point locations of the strips define extremities of the power-transfer structure 106, which may be defined by the tolerances of the ferrite bars forming the strips. By alternating the starting points of the strips at opposing sides of the power-transfer structure 106, the extremities are decoupled from the ferrite tolerances. Further, variations in output power are reduced and a coupling range is defined for coupling with a vehicle pad. The alternating starting-point locations also control an amount of power coupling between the power-transfer structure 106 of a base pad and vehicle pad by defining a coupling range of the power coupling. In addition, the alternating starting-point locations of the strips define a magnetic size of the power-transfer structure 106 effective to control magnetic field emissions associated with the coils 108, 110.

In addition, to provide some structural support to the brittle ferrite strips 118, the strips 118 are mounted to a backplate 120. The backplate 120 can be part of the housing of the power-transfer structure 106 or it can be a separate component.

Figure 2:
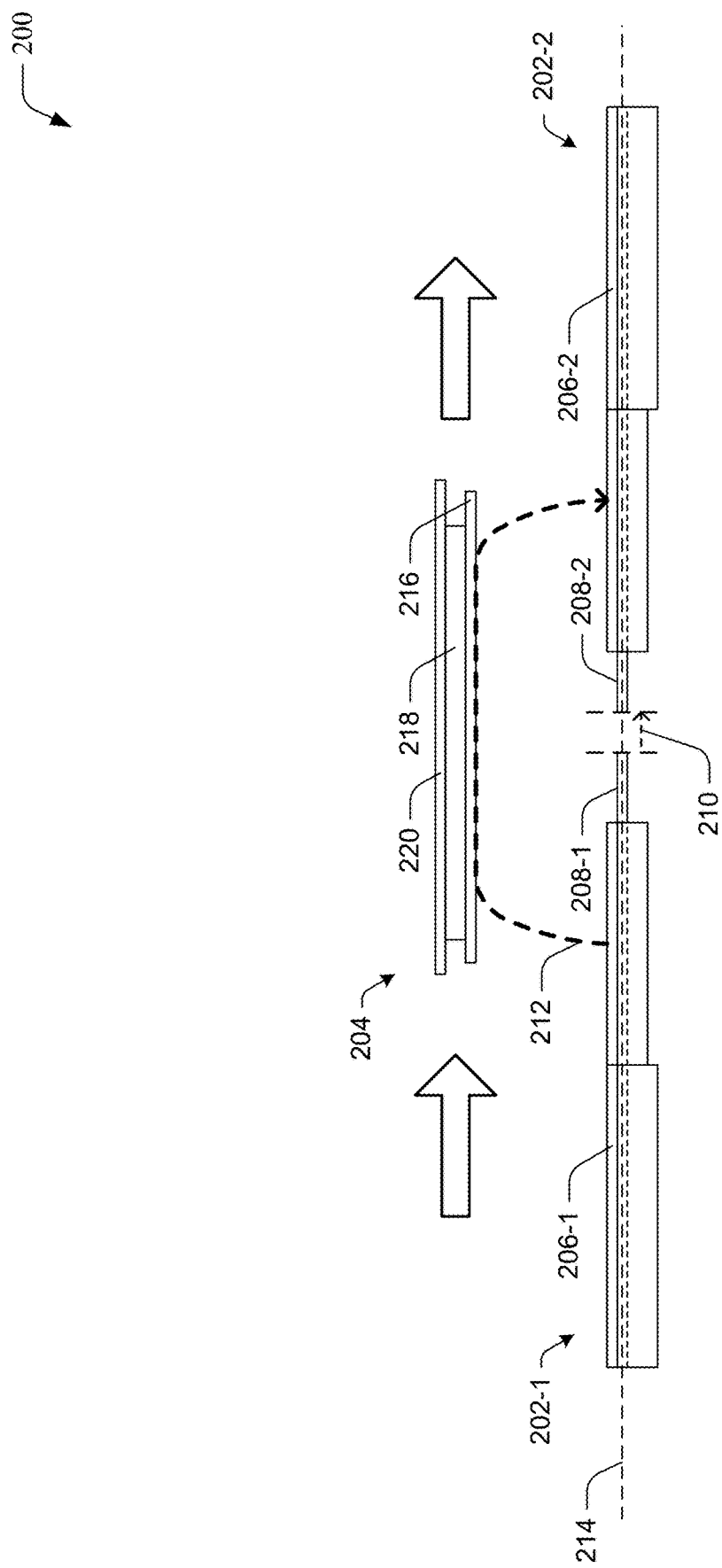
FIG. 2 illustrates an example implementation of part of a pair of dynamic wireless power-transfer structures, such as dynamic base pads, magnetically coupling with a power-transfer structure for a vehicle, such as a vehicle pad.

FIG. 2 illustrates an example implementation 200 of part of a pair of dynamic wireless power-transfer structures, such as base pads 202-1, 202-2, magnetically coupling with a power-transfer structure for a vehicle, such as a vehicle pad 204. Here, a base pad 202-1 is joined with a base pad 202-2, both of which are representations of the base dynamic wireless power-transfer structure 106 from FIG. 1. The base pad 202-1 includes a coil layer 206-1 and a ferrite layer 208-1. The coil layer 206-1 includes one or more coils configured to generate a magnetic field based on electrical current running through the coils. The ferrite layer 208-1 includes ferrite, such as ferrite strips 118, for channeling magnetic flux of the magnetic field. Similarly, the base pad 202-2 includes a coil layer 206-2 and a ferrite layer 208-2. Between the base pads 202-1, 202-2 is a space 210 filled with a component that is non-magnetic and non-conductive. Ideally, a zero gap would exist between the base pads 202-1, 202-2, which would allow the ferrite layer 208-1 of the base pad 202-1 to touch the ferrite layer 208-2 of the base pad 202-2. However, due to construction and mechanical tolerances, the space 210 generally exists between the base pads 202-1, 202-2 for ease of installation. The space 210 is also a result of a housing of each of the base pads 202-1, 202-2, where the housing is formed from a non-magnetic and non-conductive material. The housing is configured to protect the components of the base pad 202-1 from damage caused by weather, moisture, impact forces, and so on. Further, the space 210 allows the ferrite to shift from heating and cooling without cracking or breaking.

In aspects, magnetic flux travels from the base pad 202-1 to the base pad 202-2 across the space 210. The base pads 202-1, 202-2 are configured to couple with a vehicle power-transfer structure, such as vehicle pad 204, via a flux coupling path 212. This coupling can occur when the vehicle pad 204 is stationary over one or both of the base pads 202-1, 202-2, or when the vehicle pad is moving over the base pads 202-1, 202-2 along a longitudinal axis 214 of the base pads 202-1, 202-2. For example, the base pads 202-1, 202-2 can be disposed in the ground, such as in a street, and the vehicle pad 204 can be disposed in an electric vehicle driving on the street over the base pads 202-1, 202-2. The vehicle pad 204 includes at least a coil layer 216, a ferrite layer 218, and a backplate 220.

Gaseous fluids (e.g., air) have an extremely high magnetic reluctance as compared to ferrite. Consequently, the reluctance of the flux path through the space 210 is higher than the reluctance of the flux path through the ferrite layers 206-1, 206-2. Because of this, the flux power coupling between the vehicle pad 204 and the base pads 202-1, 202-2 over the space 210 is weaker than when the vehicle pad 204 is over a single base pad.

Figure 3:
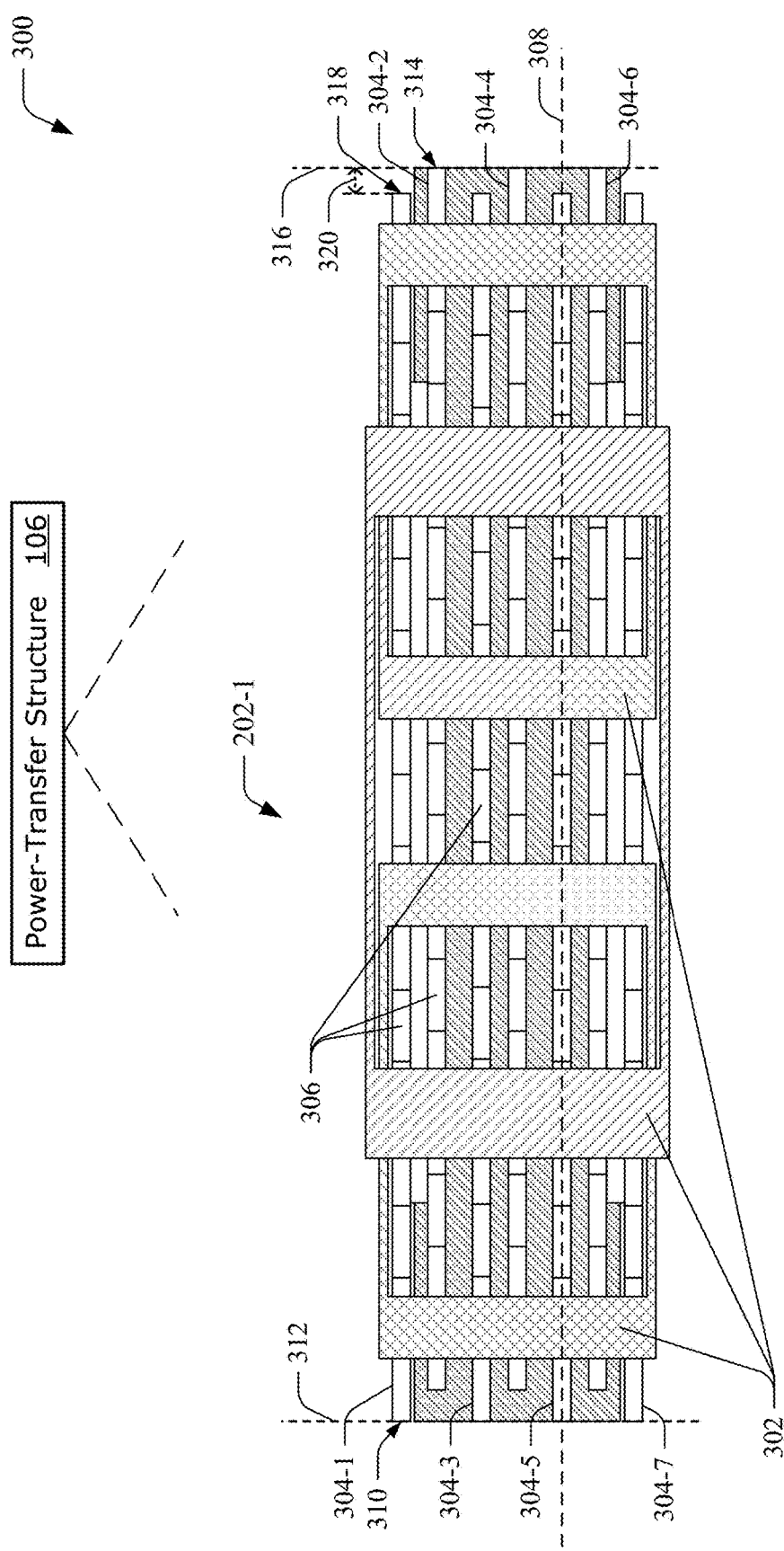
FIG. 3 illustrates an example implementation of a plan view of one of the base pads from FIG. 2 in more detail.

FIG. 3 illustrates an example implementation 300 of a plan view of one of the base pads 202-1, 202-2 from FIG. 2 in more detail. The base pad 202-1 (also referred to as a base array network ("BAN")) is illustrated as including three coils, such as coils 302 in the coil layer 206-1 from FIG. 2. However, any number of coils can be used to generate the magnetic field. The base pad 202-1 also includes multiple ferrite strips, such as strips 304-1 through 304-7, in the ferrite layer 208-1 (not shown) from FIG. 2. Each of the strips 304-1 through 304-7 are formed by multiple ferrite bars 306 disposed along a longitudinal axis of the strip, such as axis 308. In one example, each strip includes about 18 ferrite bars, which can each vary in length by ±1.8 millimeters (mm) based on dimensional tolerances in the manufacturing process. Accumulating the lengthwise dimensional tolerances of the ferrite bars forming a ferrite strip can result in a relatively large tolerance of the ferrite strip, such as 32.4 mm. While the examples described herein use specific values or measurements, these values and measurements are examples only and are not intended to be limiting. Accordingly, any suitable size of ferrite bar can be used with any suitable tolerance. Some examples include 93 mm length with ±1.8 mm tolerance, 93 mm±2 mm, 120 mm±2.5 mm, and so on. Because of the accumulated lengthwise dimensional tolerances, the strips 304-1 through 304-7 can have varying lengths, which may be unknown prior to construction of the strip. Rather, the length of a strip is a function the accumulated tolerances of the ferrite bars forming the respective strip.

In aspects, the strips 304-1 through 304-7 are disposed in a staggered arrangement in which the strips 304-1 through 304-7 alternate starting-point locations at opposing sides of the base pad 202-1. For example, the strip 304-1 has one end 310 disposed at a defined starting-point location corresponding to a left side 312 of the base pad 202-1, and the strip 304-2, which is adjacent to the strip 304-1, has an end disposed at a different defined starting-point location 314 corresponding to a right side 316 of the base pad 202-1. Each successive ferrite strip from an outer ferrite strip (e.g., strip 304-1) to an inner ferrite strip (e.g., 304-4) alternates a starting-point location at an opposing side of the base pad 202-1 from that of the previous ferrite strip. In other words, the starting-point locations of successive strips from the outer strip to an opposing outer strip, such as from strip 304-1 to strip 304-7, alternate at opposing sides of the base pad 202-1. In an example, the left side 312 of the base pad 202-1 corresponds to the starting-point location of odd-numbered strips, such as the strips 304-1, 304-3, and 304-5, whereas the right side 316 of the base pad 202-1 corresponds to the starting-point location of even-numbered strips, such as the strips 304-2, 304-4, and 304-6.

Ending-point locations of each strip may not correspond to defined locations because the ending-point location is defined by the accumulation of the lengthwise dimensional tolerances of the ferrite bars used to form the ferrite strip. Thus, the ending-point location may be unknown prior to construction of the ferrite strip. In an example, the location of an ending-point location 318 of the strip 304-1 is a function of the lengthwise tolerances of the ferrite bars 306 used to form the strip 304-1. Accordingly, the ending-point location 318 of the strip 304-1 in this example is located near the right side 316 of the base pad 202-1 but is not necessarily located at the right side 316. Consequently, a space 320 exists between the ending-point location 318 of the strip 304-1 and the right side 316 of the base pad 202-1. These and other features are further described with respect to FIG. 4.

Figure 4:
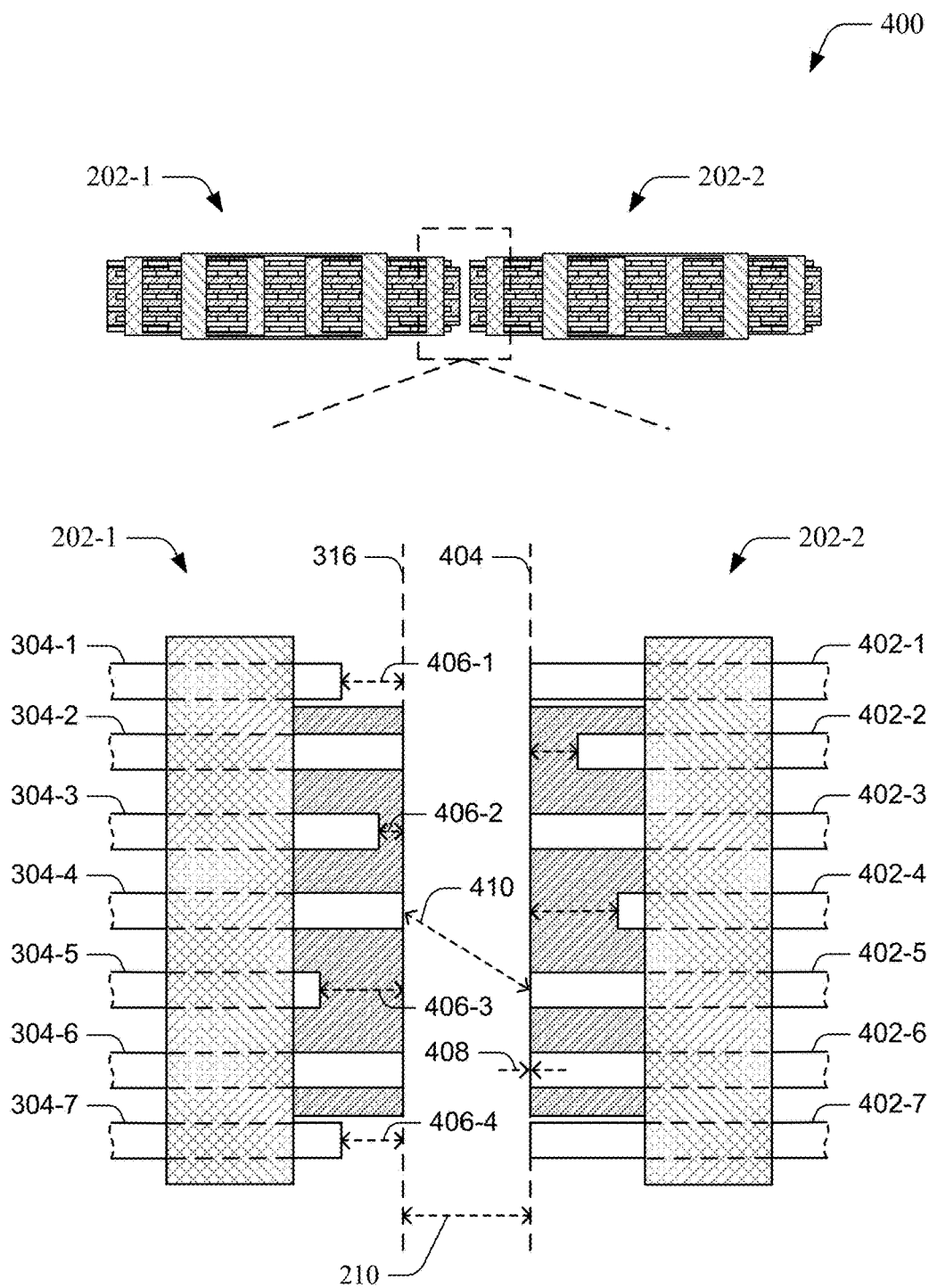
FIG. 4 illustrates an example implementation of two dynamic power-transfer structures coupled together, where each structure includes a ferrite arrangement that mitigates dimensional-tolerance effects on performance.

FIG. 4 illustrates an example implementation 400 of two dynamic power-transfer structures, such as base pads 202-1 and 202-2, coupled together, where each structure includes a ferrite arrangement that mitigates dimensional-tolerance effects on performance. Continuing with the example described above, the ferrite strips 304-1 through 304-7 are arranged such that the strips 304-1 through 304-7 alternate starting-point locations at the left and right sides of the base pad 202-1. Here, the right side 316 of the base pad 202-1 is coupled with a left side 404 the base pad 202-2. In this example, the base pad 202-2 has a similar arrangement of ferrite strips 402-1 through 402-7 to that of the base pad 202-1. Accordingly, three ferrite strips (e.g., strips 304-2, 304-4, and 304-6) each have a defined starting-point location corresponding to the right side 316 of the base pad 202-1. In the base pad 202-2, four ferrite strips (e.g., strips 402-1, 402-3, 402-5, and 402-7) each have a starting-point location corresponding to the left side 404 of the base pad 202-2. In this way, a vehicle pad passing over the base pads 202-1, 202-2 can interact with a same number of ferrite strips across both of the base pads 202-1, 202-2.

In addition, alternate ferrite strips have non-uniform ending-point locations. For example, as described above with respect to FIG. 3, each strip is formed by arranging several ferrite bars in a row starting at the starting-point location and ending at the ending-point location. The ending-point location is not predetermined because of the lengthwise tolerance of the ferrite bars. Consequently, a gap can exist between the ending-point location of a ferrite strip and the side of the base pad. For example, a gap 406-1 exists between the strip 304-1 and the right side 316 of the pad 202-1. Additional gaps 406-2, 406-3, 406-4 can exist between the right side 316 of the pad 202-1 and the strips 304-3, 304-5, and 304-7, respectively. The gaps 406-1 through 406-4 can vary in size based on at least one of the strips 304-1, 304-3, 304-5, and 304-7 having a tolerance-accumulation value that differs from that of another strip. In an example, the gaps 406-1 through 406-4 vary up to 32.4 mm, based on a lengthwise tolerance of 1.8 mm in a ferrite strip having 18 ferrite bars. In some cases, if the lengthwise tolerances of the ferrite bars of a particular strip are all at a maximum, a zero gap may result such that an ending-point location of the particular strip is located at the side of the pad. For instance, a zero gap 408 is formed between the strip 402-6 and the left side 404 of the pad 202-2. Although this particular scenario is ideal, it is not likely to be the case for every strip in the pad.

Because each of the base pads 202-1, 202-2 have ferrite strips at defined locations along the extremities of the base pads 202-1, 202-2 and the width of the space 210 is fixed, a diagonal distance 410 from a ferrite strip in the base pad 202-1 to a nearest ferrite strip in the base pad 202-2 can be calculated. Further, variable distances, such as a width of the gap 406-3, can be ignored.

Because the space 210 is fixed, the diagonal distance 410 remains constant and is therefore known. A horizontal distance between coaxial strips, such as strips 304-5 and 402-5, is equal to the width of the space 210 combined with the accumulated lengthwise tolerances of the ferrite bars forming the strip 304-5, where the accumulated tolerances result in the gap 406-3.

Defining the starting-point locations of the ferrite strips at the opposing sides of the base pad 202-1 ensures that ferrite is at the extremities of the base pad 202-1. The extremities have the largest influence on performance of the base pad 202-1. For instance, with the width of the space 210 known, ferrite at the extremities of the base pad 202-1 defines a minimum amount of power coupling to a vehicle pad over the space 210. Consequently, placing the ferrite at the extremities of the base pad 202-1 decouples the extremities from the tolerances of the ferrite bars that form the ferrite strips.

Figure 5:
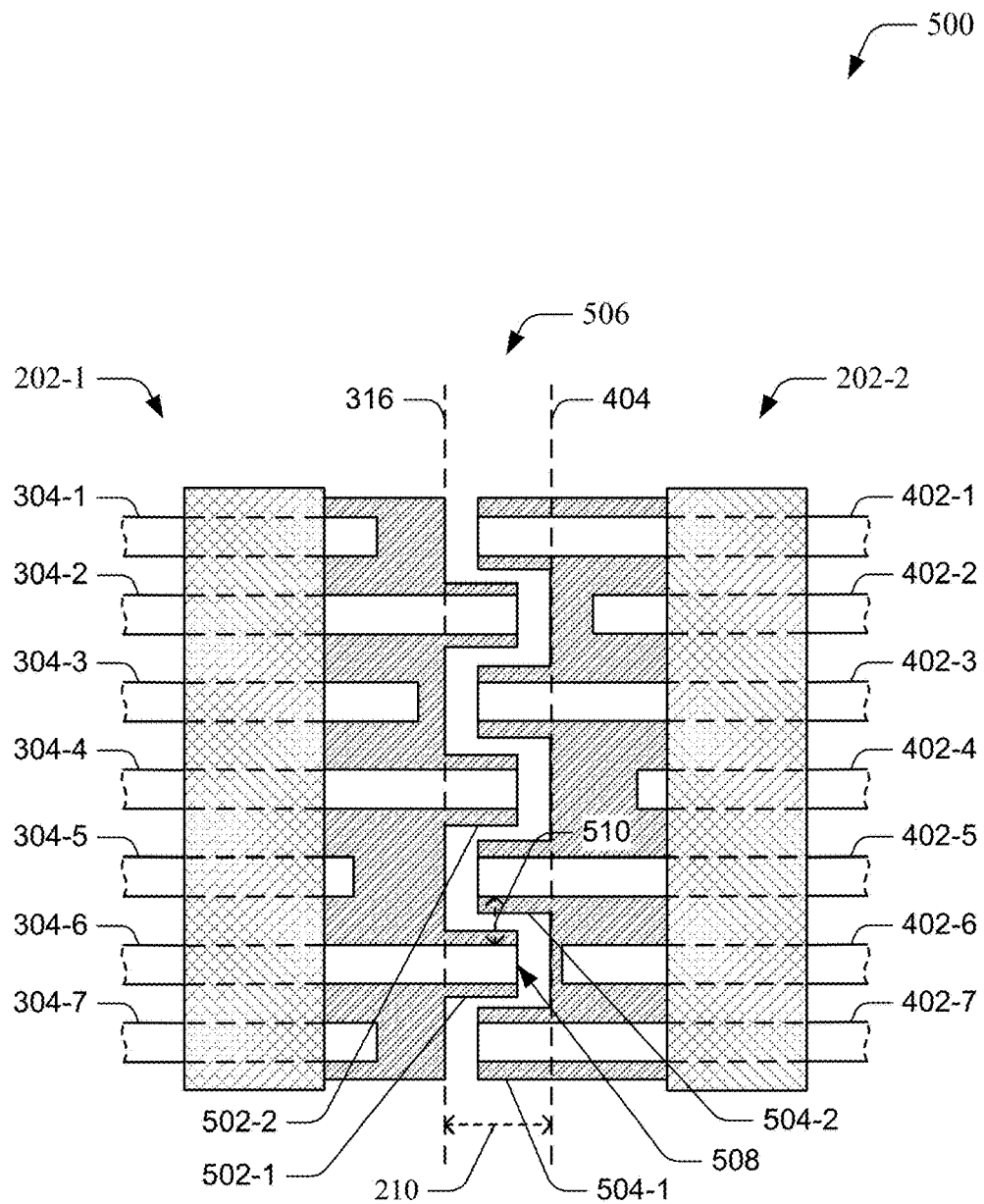
FIG. 5 illustrates an additional example implementation of two dynamic power-transfer structures coupled together.

FIG. 5 illustrates an additional example implementation 500 of two dynamic power-transfer structures coupled together. In the illustrated example, the pad 202-1 (on the left) includes the ferrite strips 304-1 through 304-7 and multiple protrusions, such as protrusions 502-1, 502-2. In addition, the pad 202-2 (on the right) includes the ferrite strips 402-1 through 402-7 and multiple additional protrusions, such as protrusions 504-1, 504-2. In aspects, the protrusions of one base pad can interlock with a the protrusions of the other base pad to form an interlocking joint 506. The interlocking joint 506 is disposed within the space 210 between the pads 202-1, 202-2. In at least some aspects, the starting-point location of a ferrite strip can correspond to a location within a protrusion or at an outer edge of the protrusion. For instance, a starting-point location 508 of the strip 304-6 corresponds to an outer edge of the protrusion 502-1. However, any suitable location within the protrusion 502-1 can be used for the starting-point location 508 of the ferrite strip 304-6.

In certain aspects, the interlocking joint 506 enables a partial horizontal overlap between ferrite strips. For instance, the strip 304-6 horizontally overlaps with the strip 402-5, such that an axis substantially perpendicular to one or both of the strips 304-6, 402-5 intersects both of the strips 304-6, 402-5. Consequently, a minimum distance 510 can be predefined to enable magnetic flux to travel across the interlocking joint 506, such as from the strip 304-6 to the strip 402-5. In aspects, the overlapping of the ferrite strips enables substantially continuous coupling with a vehicle pad passing over the interlocking joint 506. Using the interlocking joint 506, magnetic flux can pass from the ferrite strips in the protrusions of the pad to overlapping ferrite strips in interlocking protrusions in an adjacent pad. Further, as described above in relation to FIG. 4, gaps between the ending-point locations of the ferrite strips and the side of the pad can be ignored.

Figure 6:
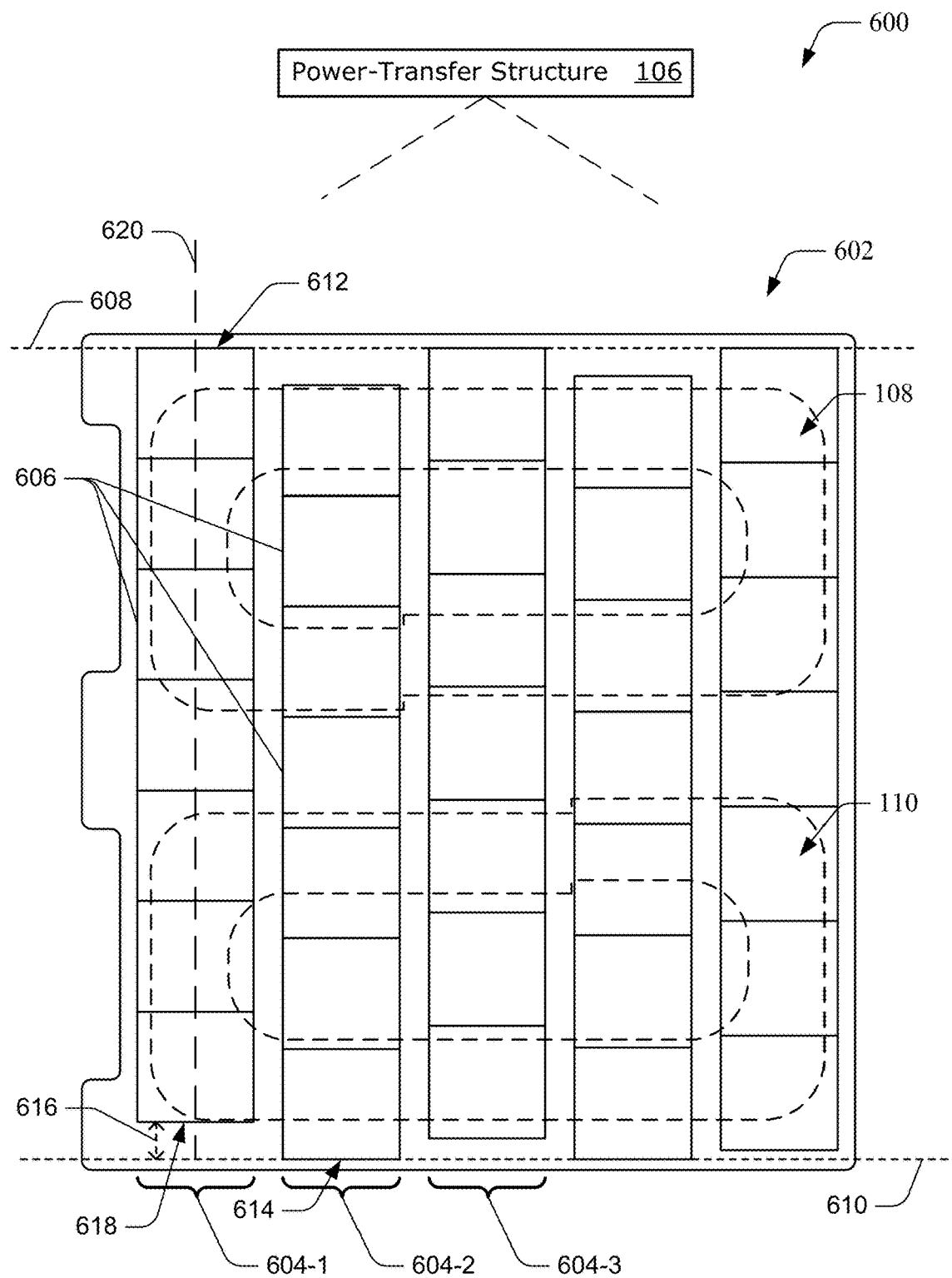
FIG. 6 illustrates an example implementation of a stationary base power-transfer structure having a staggered ferrite arrangement.

FIG. 6 illustrates an example implementation 600 of a stationary base power-transfer structure, such as stationary base pad 602, having a staggered ferrite arrangement. The base pad 602 represents an instance of the power-transfer structure 106 from FIG. 1. The stationary base pad 602 is generally sized to fit under a vehicle, such as a car. In some examples, the base pad 602 is about 700-800 mm long. Here, the base pad 602 includes a DD coil topology that includes coils 108, 110 along with multiple ferrite strips, such as strip 604-1, strip 604-2, and strip 604-3. As above, the ferrite strips are generally composed of preformed ferrite bars, such as ferrite bars 606, that follow a standard size according to manufacturing tolerances. Each strip has a starting-point location and an ending-point location. The starting-point location corresponds to a defined location, such as a location along axis 608 or axis 610, and the ending-point location represents the opposing end of the strip, which is not predetermined but is a function of the number of ferrite bars in the strip in relation to the lengthwise dimensional tolerance of each of the ferrite bars. Here, a starting-point location 612 of the strip 604-1 corresponds to the axis 608, and a starting-point location 614 of the strip 604-2 (adjacent to the strip 604-1) corresponds to the axis 610. However, a gap 616 exists between an ending-point location 618 of the strip 604-1 and the axis 610 due to the lengthwise tolerance of each bar 606 in the strip 604-1. Accordingly, the base pad 602 includes a series of ferrite strips that alternate starting-point locations at opposing sides of the pad 602.

In a stationary system, the staggered arrangement of ferrite strips is useful to ensure that magnetic field emissions are within a certain range. Magnetic field emission control is an important consideration for wireless charging systems, particularly for non-ideal alignment of the vehicle pad with the base pad, which may result in stray paths for the magnetic field. These stray paths can be problematic for foreign metal objects that react to the magnetic field by producing heat. Magnetic field emissions worsen as the vehicle pad deviates from ideal alignment (e.g., central position over the base pad). In an example, the strip 604-1 includes seven ferrite bars 606 that are each 90 mm±2 mm long. Because of the tolerance of each bar 606 in the strip 604-1, the remaining gap 616 at the end of the strip 604-1 can have a width of up to 28 mm along a longitudinal axis 620 of the strip 604-1. Rather than performing additional steps of measuring the gap 616, cutting another 90 mm±2 mm ferrite bar to fit the gap 616, and inserting the cut bar into the gap 616, the gap 616 can remain empty. Alternatively, a soft and flexible non-conductive component can be inserted into the gap 616 to cause a slight compression force to be applied to the ferrite bars 606 in the strip 604-1 to hold the ferrite bars 606 in place and push the ferrite bars 606 toward the starting-point location 612 of the strip 604-1.

Using the staggered arrangement of ferrite strips in the stationary base wireless charging pad, the magnetic field emissions of the base pad can be determined without knowing the exact size of the ferrite bars. For example, a range limit (e.g., upper limit) of magnetic field emissions can be determined effective to ensure that the magnetic field emissions do not exceed a certain value. In this way, no additional ferrite is required to be cut or fitted to the gaps. Rather, the staggered arrangement of the ferrite strips is used for controlling the range limit of the magnetic field emissions. In addition, the magnetic field emissions decrease with longer ferrite strips. Thus, a maximum value for the magnetic field emissions is based on the minimum value of the ferrite tolerances. Accordingly, the staggered arrangement of ferrite strips defines a peak level of emissions of the base pad because the arrangement defines the magnetic size of the pad. The magnetic size of the pad is equal to a minimum area that includes all the ferrite strips. A ferrite strip that is short has a minimal effect on the magnetic field at the ending-point location of the ferrite strip.

Example Procedures

The following discussion describes example procedures for mitigating dimensional-tolerance effects of ferrite on performance of a power-transfer structure, such as a WEVC pad. The example procedures may be employed in the implementation 100 of FIG. 1, the system 800 of FIG. 8, and/or any other suitable environment. The steps described for the various procedures can be implemented automatically and independent of user interaction. The orders in which operations of these procedures are shown and/or described are not intended to be construed as a limitation, and any number or combination of the described procedural operations can be combined in any order to implement a method, or an alternate method.

Figure 7:
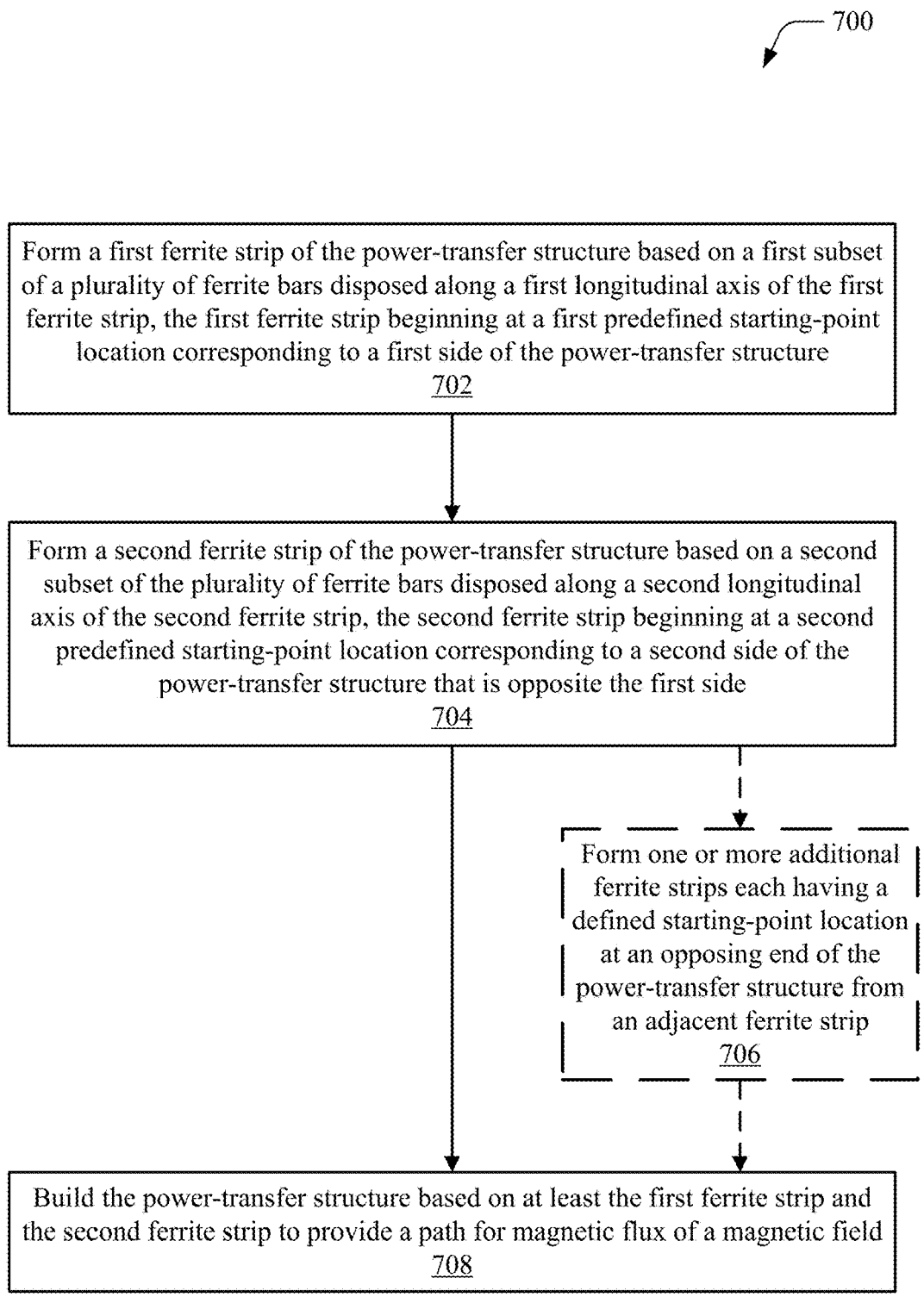
FIG. 7 depicts a flow diagram of an example process for building a power-transfer structure, such as a base WEVC pad, that mitigates dimensional-tolerance effects on performance.

FIG. 7 depicts a flow diagram of an example process 700 for building a power-transfer structure, such as a base WEVC pad, that mitigates dimensional-tolerance effects on performance. At 702, a first ferrite strip of a power-transfer structure is formed based on a first subset of a plurality of ferrite bars disposed along a longitudinal axis of the first ferrite strip. In aspects, the first ferrite strip is formed beginning at a first predefined starting-point location at a first side of the power-transfer structure and ending at a first ending-point location that is based on an accumulation of dimensional tolerances of the first subset of ferrite bars. For example, the ferrite bars can be placed within a slot and pressed together towards one end of the slot with a compression force. That end of the slot corresponds to the first side of the base pad. The other end of the strip, however, may not reach the opposing end of the slot. Rather, a space may exist between the other end of the strip and the opposing end of the slot. In aspects, the space has a length that is smaller than a length of a single ferrite bar, such that a bar cannot fit into the space without cutting or grinding the bar to a smaller size.

At 704, a second ferrite strip of the power-transfer structure is formed based on a second subset of the plurality of ferrite bars disposed along a longitudinal axis of the second ferrite strip. The second ferrite strip beginning at a second predefined starting-point location at a second side of the power-transfer structure that is opposite the first side and ending at a second ending-point location that is based on an accumulation of dimensional tolerances of the second subset of ferrite bars. For example, the second ferrite strip is formed similarly to the first ferrite strip, such as by placing ferrite bars into a slot and pressing them together towards one end of the slot, specifically towards the second side of the power-transfer structure which is opposite to the starting-point location of the first ferrite strip.

Optionally at 706, one or more additional ferrite strips are formed each having a defined starting-point location at an opposing end of the power-transfer structure from an adjacent ferrite strip. For example, each successive ferrite strip in a series of strips begins at an opposing side of the power-transfer structure from a starting-point location of a previous adjacent strip. The ferrite strips have varying lengths relative to one another because the lengths are based on the lengthwise dimensional tolerances of the ferrite bars used to form a respective strip. Accordingly, the series of ferrite strips is constructed that form a staggered pattern of starting-point locations alternating at opposing sides of the power-transfer structure.

At 708, the power-transfer structure is built based on at least the first ferrite strip and the second ferrite strip. The power-transfer structure may further be constructed using the one or more additional strips. In aspects, building the power-transfer structure includes constructing the power-transfer structure to have the ferrite strips arranged in the staggered pattern. Further, any number of ferrite strips can be utilized to build the power-transfer structure.

Example Wireless Power Transfer System

The following discussion describes example wireless power transfer systems for mitigating dimensional-tolerance effects on performance. The systems described below can include the above-described implementations described with respect to FIGS. 1-6 and can be used to employ the above-described methods described with respect to FIG. 7. An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include, besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Figure 8:
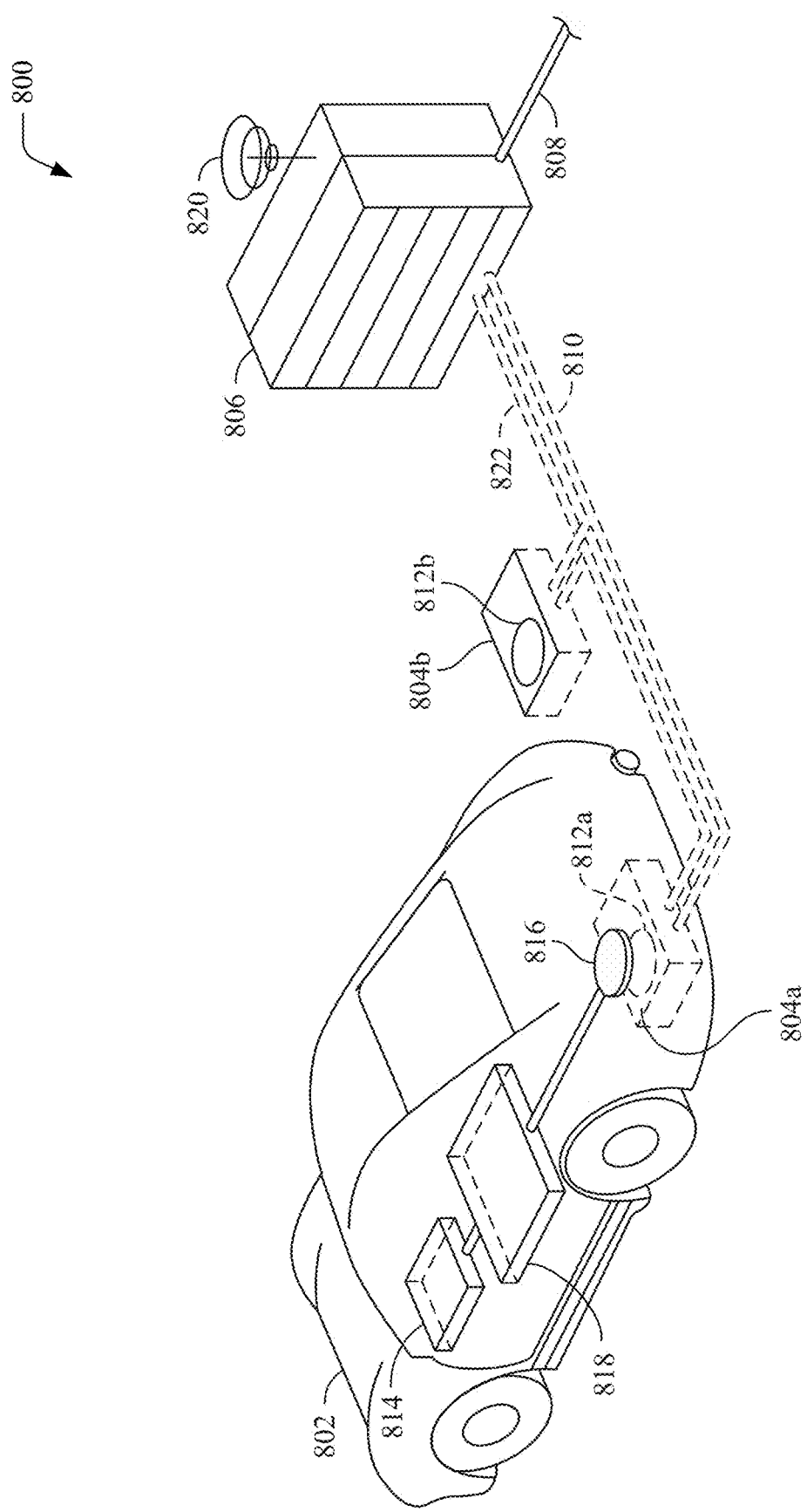
FIG. 8 is a diagram of an exemplary wireless power transfer system for charging an electric vehicle.

FIG. 8 is a diagram of an exemplary wireless power transfer system 800 for charging an electric vehicle, in accordance with some exemplary implementations. The wireless power transfer system 800 enables charging of an electric vehicle 802 while the electric vehicle 802 is stationary so as to efficiently couple with a base wireless charging system 804a. Spaces for two electric vehicles are illustrated in a parking area to be parked over corresponding base wireless charging systems 804a and 804b. In some implementations, a local distribution center 806 may be connected to a power backbone 808 and configured to provide an alternating current (AC) or a direct current (DC) supply through a power link 810 to the base wireless charging systems 804a and 804b. Each of the base wireless charging systems 804a and 804b also includes a base power-transfer structure 812a and 812b, respectively, for wirelessly transferring power. In some other implementations (not shown in FIG. 8), base power-transfer structures 812a or 812b may be stand-alone physical units and are not part of the base wireless charging system 804a or 804b. An example of base power-transfer structures 812a or 812b includes the power-transfer structure 106 as described with reference to FIGS. 1-3.

The electric vehicle 802 may include a battery unit 814, an electric vehicle power-transfer structure 816, and a wireless electric vehicle charging (WEVC) system 818. The WEVC system 818 and the electric vehicle power-transfer structure 816 constitute the wireless charging system for the electric vehicle 802. In some diagrams shown herein, the WEVC system 818 is also referred to as a vehicle charging unit (VCU). The electric vehicle power-transfer structure 816, such as the wireless power-transfer structure 106, may interact with the base power-transfer structure 812a, for example via a region of the electromagnetic field generated by the base power-transfer structure 812a.

In some exemplary implementations, the electric vehicle power-transfer structure 816 may receive power when the electric vehicle power-transfer structure 816 is located in an electromagnetic field produced by the base power-transfer structure 812a. The field may correspond to a region where energy output by the base power-transfer structure 812a may be captured by the electric vehicle power-transfer structure 816. For example, the energy output by the base power-transfer structure 812a may be at a level sufficient to charge or power the electric vehicle 802. In some cases, the field may correspond to a "near-field" of the base power-transfer structure 812a. The near-field may correspond to a region in which there are strong reactive fields resulting from the currents and charges in the base power-transfer structure 812a that do not radiate power away from the base power-transfer structure 812a. In at least one example, the near-field may correspond to a region that is within about ½π of a wavelength of a frequency of the electromagnetic field produced by the base power-transfer structure 812a distant from the base power-transfer structure 812a, as will be further described below.

The electric vehicle power-transfer structure 816 may be aligned with the base power-transfer structure 812a and, therefore, disposed within a near-field region simply by the electric vehicle operator positioning the electric vehicle 802 such that the electric vehicle power-transfer structure 816 is sufficiently aligned relative to the base power-transfer structure 812a. Alignment may be considered sufficient when an alignment error has fallen below a tolerable value. The operator may, however, be given visual and/or auditory feedback to determine when the electric vehicle 802 is properly placed within a tolerance area for wireless power transfer. The electric vehicle 802 may be positioned by an autopilot system, which moves the electric vehicle 802 until the sufficient alignment is achieved. This may be performed automatically and autonomously by the electric vehicle 802 with or without driver intervention. This may be possible for an electric vehicle 802 that is equipped with a servo steering, radar sensors (e.g., ultrasonic sensors), and intelligence for safely maneuvering and adjusting the electric vehicle. The electric vehicle 802 and/or the base wireless charging system 804a may have functionality for mechanically displacing and moving the power-transfer structures 816 and 812a, respectively, relative to each other to more accurately orient or align them and develop sufficient and/or otherwise more efficient coupling there between.

The base wireless charging system 804a may be located in a variety of locations. As non-limiting examples, some suitable locations include a parking area at a home of the electric vehicle 802 owner, parking areas reserved for electric vehicle wireless charging modeled after conventional petroleum-based filling stations, stoplights, and other locations, such as shopping centers and places of employment, when a vehicle may be stationary for some period of time. Local distribution center 806 may be configured to communicate with external sources (e.g., a power grid) via a communication backhaul 820, and with the base wireless charging system 804a via a communication link 822.

Charging electric vehicles wirelessly may provide numerous benefits. For example, charging may be performed automatically, virtually without driver intervention or manipulation thereby improving convenience to a user. There may also be no exposed electrical contacts and no mechanical wear out, thereby improving reliability of the wireless power transfer system 800 as compared to a wired power transfer system. Safety may be improved since manipulations with cables and connectors may not be needed and there may be no cables, plugs, or sockets to be exposed to moisture in an outdoor environment. In addition, there may also be no visible or accessible sockets, cables, or plugs, thereby reducing potential vandalism of power charging devices. Further, since the electric vehicle 802 may be used as distributed storage devices to stabilize a power grid, a convenient docking-to-grid solution may help to increase availability of vehicles for vehicle-to-grid (V2G) operation. The wireless power transfer system 800 may also provide aesthetical and non-impedimental advantages. For example, there may be no charge columns or cables that may be impedimental for vehicles and/or pedestrians.

As a further explanation of the vehicle-to-grid capability, the wireless power transmit and receive capabilities may be configured to be reciprocal such that either the base wireless charging system 804a can transmit power to the electric vehicle 802 or the electric vehicle 802 can transmit power to the base wireless charging system 804a. This capability may be useful to stabilize the power distribution grid by allowing electric vehicles 802 to contribute power to the overall distribution system in times of energy shortfall caused by over demand or shortfall in renewable energy production (e.g., wind or solar).

Figure 9:
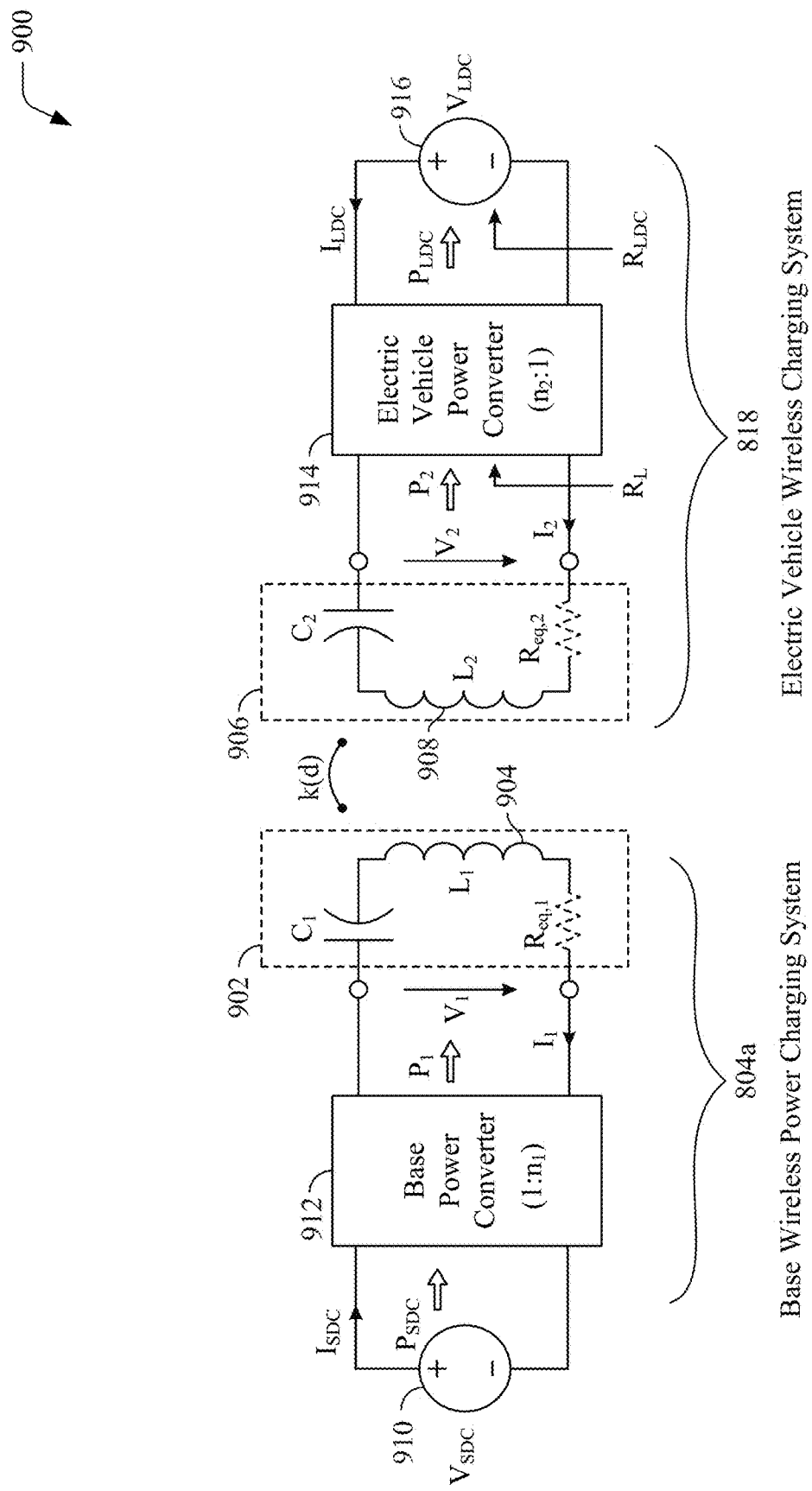
FIG. 9 is a schematic diagram of exemplary components of the wireless power transfer system of FIG. 8.

FIG. 9 is a schematic diagram of exemplary components of a wireless power transfer system 900 similar to that previously discussed in connection with FIG. 8, in accordance with some exemplary implementations. The wireless power transfer system 900 may include a base resonant circuit 902 including a base power-transfer structure 904, such as the power-transfer structure 106, having an inductance $L_1$. The wireless power transfer system 900 further includes an electric vehicle resonant circuit 906 including an electric vehicle power-transfer structure 908, such as the power-transfer structure 106, having an inductance $L_2$. In aspects, capacitively loaded conductor loops (e.g., multi-turn coils—e.g., potentially using Litz wire) are used that form a resonant structure capable of efficiently coupling energy from a primary structure (transmitter) to a secondary structure (receiver) via a magnetic or electromagnetic near-field if both the transmitter and the receiver are tuned to a common resonant frequency. The coils may be used for the electric vehicle power-transfer structure 908 and the base power-transfer structure 904. Using resonant structures for coupling energy may be referred to as "magnetically coupled resonance," "electromagnetically coupled resonance," and/or "resonant induction." The operation of the wireless power transfer system 900 is described herein based on power transfer from the base power-transfer structure 904 to the electric vehicle 802 (not shown in FIG. 9), but is not limited thereto. For example, as discussed above, energy may also be transferred in the reverse direction.

With reference to FIG. 9, a power supply 910 (e.g., AC or DC) supplies power $P_{SDC}$ to a base power converter 912 as part of the base wireless charging system 804a to transfer energy to an electric vehicle (e.g., electric vehicle 802 of FIG. 8). The base power converter 912 may include circuitry such as an AC-to-DC converter configured to convert power from standard mains AC to DC power at a suitable voltage level, and a DC-to-low frequency (LF) converter configured to convert DC power to power at an operating frequency suitable for wireless high power transfer. The base power converter 912 supplies power $P_1$ to the base resonant circuit 902 including tuning capacitor $C_1$ in series with base power-transfer structure 904 to emit an electromagnetic field at the operating frequency. In some aspects, the capacitor $C_1$ may be coupled with the base power-transfer structure 904 in parallel. Tuning may, however, be formed of several reactive elements in any combination of parallel or series topology. The capacitor $C_1$ may be provided to form a resonant circuit with the base power-transfer structure 904 that resonates substantially at the operating frequency. The base power-transfer structure 904 receives the power $P_1$ and wirelessly transmits power at a level sufficient to charge or power the electric vehicle. For example, the level of power provided wirelessly by the base power-transfer structure 904 may be on the order of kilowatts (kW) (e.g., anywhere from 1 kW to 80 kW, although actual levels may be or higher or lower).

The base resonant circuit 902 (including the base power-transfer structure 904 and tuning capacitor $C_1$) and the electric vehicle resonant circuit 906 (including the electric vehicle power-transfer structure 908 and tuning capacitor $C_2$) may be tuned to substantially the same frequency. The electric vehicle power-transfer structure 908 may be positioned within the near-field of the base power-transfer structure 904 and vice versa, as further explained below. In this case, the base power-transfer structure 904 and the electric vehicle power-transfer structure 908 may become coupled to one another such that power may be transferred wirelessly from the base power-transfer structure 904 to the electric vehicle power-transfer structure 908. The series capacitor $C_2$ may be provided to form a resonant circuit with the electric vehicle power-transfer structure 908 that resonates substantially at the operating frequency. In some aspects, the capacitor $C_2$ may be coupled with the electric vehicle power-transfer structure 908 in parallel. The electric vehicle resonant circuit 906 may, however, be formed of several reactive elements in any combination of parallel or series topology. Element k(d) represents the mutual coupling coefficient resulting at coil separation d. Equivalent resistances $R_{eq,1}$ and $R_{eq,2}$ represent the losses that may be inherent to the base and electric vehicle power-transfer structures 904 and 908 and the tuning (anti-reactance) capacitors $C_1$ and $C_2$, respectively. The electric vehicle resonant circuit 906, including the electric vehicle power-transfer structure 908 and capacitor $C_2$, receives the power $P_2$ and provides the power $P_2$ to an electric vehicle power converter 914 of the WEVC system 818.

The electric vehicle power converter 914 may include, among other things, a LF-to-DC converter configured to convert power at an operating frequency back to DC power at a voltage level of a load 916 that may represent the electric vehicle battery unit. The electric vehicle power converter 914 may provide the converted power $P_{LDC}$ to the load 916. The power supply 910, base power converter 912, and base power-transfer structure 904 may be stationary and located at a variety of locations as discussed above. The load 916 (e.g., the electric vehicle battery unit), electric vehicle power converter 914, and electric vehicle power-transfer structure 908 may be included in the WEVC system 818 that is part of the electric vehicle (e.g., electric vehicle 802) or part of its battery pack (not shown). The WEVC system 818 may also be configured to provide power wirelessly through the electric vehicle power-transfer structure 908 to the base wireless charging system 804a to feed power back to the grid or other power supply 910. Each of the electric vehicle power-transfer structure 908 and the base power-transfer structure 904 may act as transmit or receive power-transfer structures based on the mode of operation.

Although not shown, the wireless power transfer system 900 may include a load disconnect unit (LDU) to safely disconnect the electric vehicle load 916 or the power supply 910 from the wireless power transfer system 900. For example, in case of an emergency or system failure, the LDU may be triggered to disconnect the load from the wireless power transfer system 900. The LDU may be provided in addition to a battery management system for managing charging of a battery, or the LDU may be part of the battery management system.

Further, the WEVC system 818 may include switching circuitry (not shown) for selectively connecting and disconnecting the electric vehicle power-transfer structure 908 to the electric vehicle power converter 914. Disconnecting the electric vehicle power-transfer structure 908 may suspend charging and also may change the "load" as "seen" by the base wireless charging system 804a (acting as a transmitter), which may be used to "cloak" the WEVC system 818 (acting as the receiver) from the base wireless charging system 804a. The load changes may be detected if the transmitter includes a load sensing circuit. Accordingly, the transmitter, such as the base wireless charging system 804a, may have a mechanism for determining when receivers, such as the WEVC system 818, are present in the near-field coupling mode region of the base power-transfer structure 904 as further explained below.

As described above, during energy transfer towards an electric vehicle (e.g., electric vehicle 802 of FIG. 8), input power is provided from the power supply 910 such that the base power-transfer structure 904 generates an electromagnetic field for providing the energy transfer. The electric vehicle power-transfer structure 908 couples to the electromagnetic field and generates output power for storage or consumption by the electric vehicle 802. In some aspects, the base resonant circuit 902 and electric vehicle resonant circuit 906 are configured and tuned according to a mutual resonant relationship such that they are resonating nearly or substantially at the operating frequency. Transmission losses between the base wireless charging system 804a and WEVC system 818 are minimal when the electric vehicle power-transfer structure 908 is located in the near-field coupling mode region of the base power-transfer structure 904 as further explained below.

As stated, an efficient energy transfer occurs by transferring energy via a magnetic near-field rather than via electromagnetic waves in the far-field, which may involve substantial losses due to radiation into the space. When in the near-field, a coupling mode may be established between the transmit power-transfer structure and the receive power-transfer structure. The space around the power-transfer structures where this near-field coupling may occur is referred to herein as a near-field coupling mode region.

While not shown, the base power converter 912 and the electric vehicle power converter 914 if bidirectional may both include, for a transmit mode, an oscillator, a driver circuit such as a power amplifier, a filter and matching circuit, and for a receive mode a rectifier circuit. The oscillator may be configured to generate a desired operating frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance as presented by the resonant circuits 902 and 906 to the base and electric vehicle power converters 912 and 914, respectively. For the receive mode, the base and electric vehicle power converters 912 and 914 may also include a rectifier and switching circuitry.

The electric vehicle power-transfer structure 908 and the base power-transfer structure 904 as described throughout the disclosed implementations may be referred to or configured as "conductor loops," and more specifically, as "multi-turn conductor loops" or coils (e.g., potentially implemented as Litz wire wound to have multiple turns). The base and electric vehicle power-transfer structures 904 and 908 may also be referred to herein or be configured as "magnetic" power-transfer structures. The term "power-transfer structure" is intended to refer to a component that may wirelessly output or receive energy for coupling to another "power-transfer structure."

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency.

A resonant frequency may be based on the inductance and capacitance of a resonant circuit (e.g. resonant circuit 902) including a power-transfer structure (e.g., the base power-transfer structure 904 and capacitor $C_1$) as described above. As shown in FIG. 9, inductance may generally be the inductance of the power-transfer structure, whereas, capacitance may be added to the power-transfer structure to create a resonant structure at a desired resonant frequency. Accordingly, for larger size power-transfer structures using larger diameter coils exhibiting larger inductance, the value of capacitance needed to produce resonance may be lower. Inductance may also depend on a number of turns of a coil. Furthermore, as the size of the power-transfer structure increases, coupling efficiency may increase. This is mainly true if the size of both base and electric vehicle power-transfer structures increase. Furthermore, a resonant circuit including a power-transfer structure and tuning capacitor may be designed to have a high quality (Q) factor to improve energy transfer efficiency. For example, the Q factor may be 300 or greater.

As described above, the near-field may correspond to a region around the power-transfer structure in which mainly reactive electromagnetic fields exist. If the physical size of the power-transfer structure is much smaller than the wavelength, inversely proportional to the frequency, there is no substantial loss of power due to waves propagating or radiating away from the power-transfer structure. Near-field coupling-mode regions may correspond to a volume that is near the physical volume of the power-transfer structure, typically within a small fraction of the wavelength. According to some aspects, power-transfer structures, such as single and multi-turn conductor loops, are preferably used for both transmitting and receiving since handling magnetic fields in practice is easier than electric fields because there is less interaction with foreign objects, e.g., dielectric objects and the human body. Nevertheless, "electric" power-transfer structures (e.g., dipoles and monopoles) or a combination of magnetic and electric power-transfer structures may be used.

Figure 10:
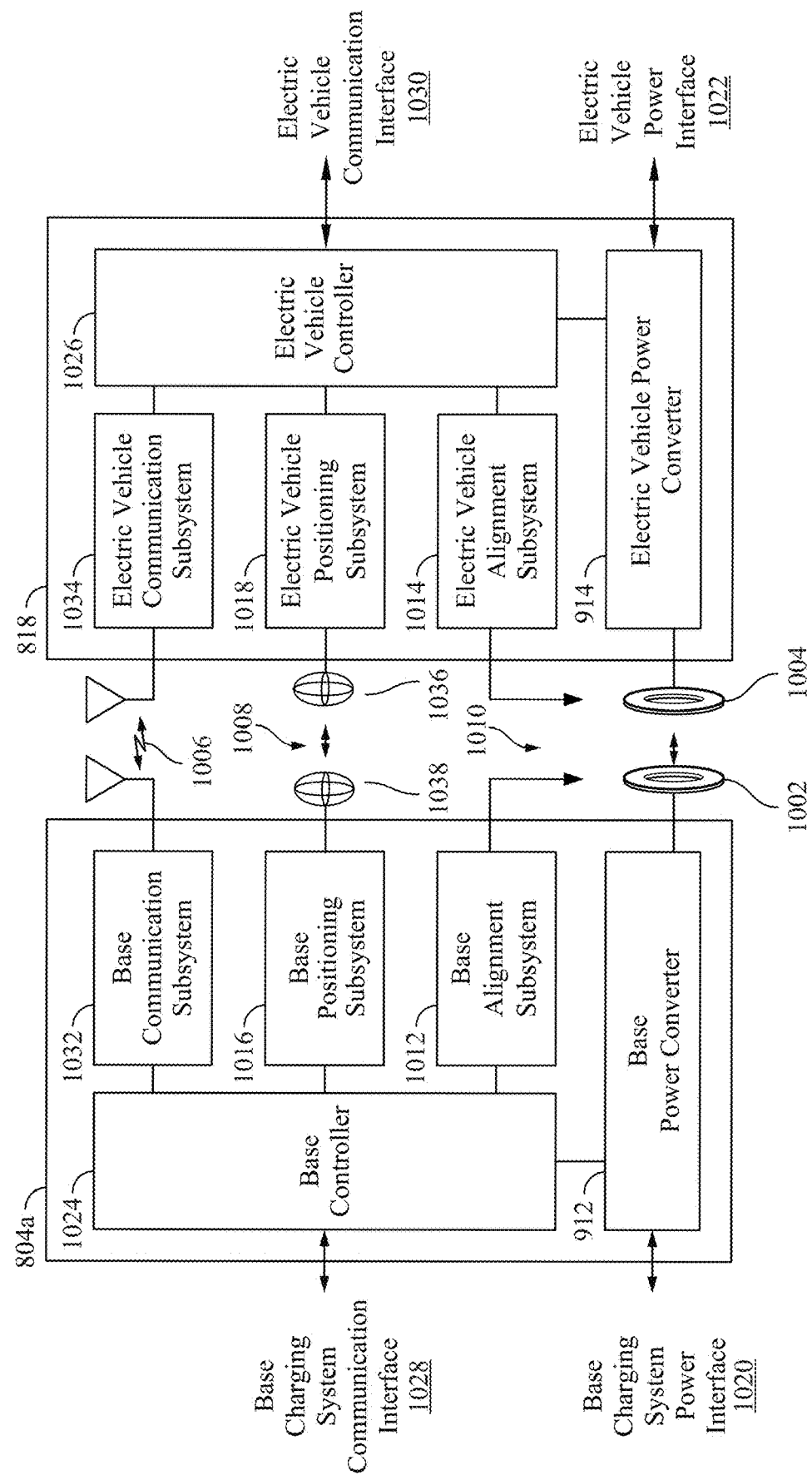
FIG. 10 is a functional block diagram showing exemplary components of the wireless power transfer system of FIG. 8.

FIG. 10 is a functional block diagram showing exemplary components of wireless power transfer system 1000, which may be employed in the wireless power transfer system 800 of FIG. 8 and/or may be included as part of the wireless power transfer system 900 of FIG. 9. The wireless power transfer system 1000 illustrates a base power-transfer structure 1002 and an electric vehicle power-transfer structure 1004. In addition, the wireless power transfer system 1000 includes a communication link 1006; a positioning link 1008, using, for example, a magnetic field signal for determining a position or direction; and an alignment mechanism 1010 capable of mechanically moving one or both of the base power-transfer structure 1002 and the electric vehicle power-transfer structure 1004. An example of the base power-transfer structure 1002 and/or the electric vehicle power-transfer structure 1004 is the power-transfer structure 106 described above with reference to FIG. 1. Mechanical (kinematic) alignment of the base power-transfer structure 1002 and the electric vehicle power-transfer structure 1004 may be controlled by a base alignment subsystem 1012 and an electric vehicle alignment subsystem 1014, respectively. The positioning link 1008 may be capable of bi-directional signaling, meaning that positioning signals may be emitted by a base positioning subsystem 1016 or an electric vehicle positioning subsystem 1018, or by both.

As described above with reference to FIG. 8, when energy flows towards the electric vehicle 802, in FIG. 10 a base charging system power interface 1020 may be configured to provide power to a base power converter 912 from a power source, such as an AC or DC power supply (not shown). The base power converter 912 may receive AC or DC power via the base charging system power interface 1020 to drive the base power-transfer structure 1002 at a frequency near or at the resonant frequency of the base resonant circuit 902 with reference to FIG. 9. The electric vehicle power-transfer structure 1004, when in the near-field coupling-mode region, may receive energy from the electromagnetic field to oscillate at or near the resonant frequency of the electric vehicle resonant circuit 906 with reference to FIG. 9. The electric vehicle power converter 914 converts the oscillating signal from the electric vehicle power-transfer structure 1004 to a power signal suitable for charging a battery via an electric vehicle power interface 1022.

The base wireless charging system 804a includes a base controller 1024, and the WEVC system 818 includes an electric vehicle controller 1026. The base controller 1024 may provide a base charging system communication interface 1028 to other systems (not shown) such as, for example, a computer, a base common communication (BCC), a communications entity of the power distribution center, or a communications entity of a smart power grid. The electric vehicle controller 1026 may provide an electric vehicle communication interface 1030 to other systems (not shown) such as, for example, an on-board computer on the vehicle, a battery management system, other systems within the vehicle, and remote systems.

The wireless power transfer system 1000 is illustrated as including a base communication subsystem 1032 and an electric vehicle communication subsystem 1034 that may include subsystems or modules for specific application with separate communication channels and also for wirelessly communicating with other communications entities not shown in the diagram of FIG. 10. These communications channels may be separate physical channels or separate logical channels. As non-limiting examples, the base alignment subsystem 1012 may communicate with the electric vehicle alignment subsystem 1014 through the communication link 1006 to provide a feedback mechanism for more closely aligning the base power-transfer structure 1002 and the electric vehicle power-transfer structure 1004, for example via autonomous mechanical (kinematic) alignment, by either the electric vehicle alignment subsystem 1014 or the base alignment subsystem 1012, or by both, or with operator assistance as described herein.

The WEVC system 818 may further include the electric vehicle positioning subsystem 1018 connected to a magnetic field generator 1036. The electric vehicle positioning subsystem 1018 may be configured to drive the magnetic field generator 1036 with currents that generate an alternating magnetic field. The base wireless charging system 804a may include a magnetic field sensor 1038 connected to a base positioning subsystem 1016. The magnetic field sensor 1038 may be configured to generate a plurality of voltage signals under influence of the alternating magnetic field generated by the magnetic field generator 1036. The base positioning subsystem 1016 may be configured to receive these voltage signals and output a signal indicative of a position estimate and an angle estimate between the magnetic field sensor 1038 and the magnetic field generator 1036. These position and angle estimates may be translated into visual and/or acoustic guidance and alignment information that a driver of the electric vehicle may use to reliably park the vehicle. In some implementations, these position and angle estimates may be used to park a vehicle automatically with no or only minimal driver intervention (drive by wire).

In some implementations, the positioning error (error in the position estimates) at offsets (distances)<20 cm may be specified to <2 cm, and for distances >20 cm to <1% of distance, e.g., <10 cm at a distance of 1 m and <50 cm at a distance of 5 m, where the distance refers to the horizontal distance between the magnetic centers of the magnetic field generator 1036 and the magnetic field sensor 1038. The positioning error may refer to the error magnitude (error radius) and, e.g., to the $100^{th}$ percentile of position error statistics. Accordingly, the orientation error (error in the angle estimate) at distances <20 cm may be specified to <2°, and for distances >20 cm to <5°.

Further, the electric vehicle controller 1026 may be configured to communicate with electric vehicle onboard systems. For example, the electric vehicle controller 1026 may provide, via the electric vehicle communication interface 1030, position data, e.g., for a brake system configured to perform a semi-automatic parking operation, or for a steering servo system configured to assist with a largely automated parking ("park by wire") that may provide more convenience and/or higher parking accuracy as may be needed in certain applications to provide sufficient alignment between base and electric vehicle power-transfer structures 1002 and 1004. Moreover, electric vehicle controller 1026 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

The wireless power transfer system 1000 may also support plug-in charging via a wired connection, for example, by providing a wired charge port (not shown) at the WEVC system 818. The WEVC system 818 may integrate the outputs of the two different chargers prior to transferring power to or from the electric vehicle. Switching circuits may provide the functionality as needed to support both wireless charging and charging via a wired charge port.

To communicate between the base wireless charging system 804a and the WEVC system 818, the wireless power transfer system 1000 may use in-band signaling via base and electric vehicle power-transfer structures 1002, 1004 and/or out-of-band signaling via communications systems (subsystems 1032, 1034), e.g., via an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

Some communications (e.g., in-band signaling) may be performed via the wireless power link without using specific communications antennas. For example, the base and electric vehicle power-transfer structures 1002 and 1004 may also be configured to act as wireless communication antennas. Thus, some implementations of the base wireless charging system 804a may include a controller (not shown) for enabling keying type protocol on the wireless power path. By keying the transmit power level (amplitude shift keying) at predefined intervals with a predefined protocol, the receiver may detect a serial communication from the transmitter. The base power converter 912 may include a load sensing circuit (not shown) for detecting the presence or absence of active electric vehicle power receivers in the near-field coupling mode region of the base power-transfer structure 1002. By way of example, a load sensing circuit monitors the current flowing to a power amplifier of the base power converter 912, which is affected by the presence or absence of active power receivers in the near-field coupling mode region of the base power-transfer structure 1002. Detection of changes to the loading on the power amplifier may be monitored by the base controller 1024 for use in determining whether to enable the base wireless charging system 804a for transmitting energy, to communicate with a receiver, or a combination thereof.

Although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. A wireless power-transfer structure comprising:
   one or more coils configured to generate a magnetic field; and
   a set of ferrite strips arranged to provide a path for magnetic flux induced by the magnetic field, the set of ferrite strips bounded by a first side and a second side opposite the first side, the set of ferrite strips including a first plurality of ferrite strips and a second plurality of ferrite strips interleaved with the first plurality of ferrite strips, the set of ferrite strips arranged in a staggered pattern including the first plurality of ferrite strips extending from the first side and the second plurality of ferrite strips extending from the second side, at least two of the ferrite strips in the first plurality of ferrite strips having varying lengths one to another, at least two of the ferrite strips in the second plurality of ferrite strips having varying lengths one to another, respective ferrite strips in set of ferrite strips each having a length that is greater than a width of a coil boundary defined by a perimeter of the one or more coils, the one or more coils positioned between opposing ends of each of the respective ferrite strips in the set of ferrite strips.

2. The wireless power-transfer structure as described in claim 1, wherein the length of a respective ferrite strip is based on an accumulation of lengthwise dimensional tolerances of ferrite bars, and the first plurality of ferrite strips does not extend fully to the second side.

3. The wireless power-transfer structure as described in claim 1, further comprising a housing configured to house the one or more coils and the set of ferrite strips, the housing comprising the first side and the second side.

4. The wireless power-transfer structure as described in claim 1, wherein:
   the one or more coils form a coil layer; and
   the set of ferrite strips forms a ferrite layer proximate to the coil layer.

5. The wireless power-transfer structure as described in claim 1, wherein each strip of the set of ferrite strips includes a longitudinal axis that is substantially parallel to a direction of the magnetic field.

6. The wireless power-transfer structure as described in claim 1, wherein:
   the varying lengths of the at least two of the first plurality of ferrite strips and the at least two of the second plurality of ferrite strips are based on lengthwise dimensional tolerances of the respective ferrite strips;
   the first plurality of ferrite strips have uniform first starting point locations and non-uniform first ending-point locations; and
   the second plurality of ferrite strips have uniform second starting point locations and non-uniform second ending-point locations.

7. The wireless power-transfer structure as described in claim 1, wherein an ending-point location of a respective ferrite strip of the set of ferrite strips is based on an accumulation of lengthwise dimensional tolerances of a subset of a plurality of ferrite bars that form the respective ferrite strip.

8. The wireless power-transfer structure as described in claim 1, wherein the set of ferrite strips are arranged in the staggered pattern to control variations in output power that result from tolerances in ferrite bars that form the respective ferrite strips of the set of ferrite strips.

9. The wireless power-transfer structure as described in claim 1, further comprising a housing configured to be disposed proximate to a dynamic wireless power-transfer structure of a dynamic wireless electric vehicle charging system to enable the magnetic flux to pass from the set of ferrite strips to additional ferrite strips in the dynamic wireless power-transfer structure.

10. The wireless power-transfer structure as described in claim 1, further comprising another one or more coils positioned adjacent to the one or more coils and another set of ferrite strips arranged in a staggered pattern.

11. The wireless power-transfer structure as described in claim 1, wherein the staggered pattern of the set of ferrite strips is effective to:
   decouple extremities of the set of ferrite strips from lengthwise dimensional tolerances of ferrite bars that form each ferrite strip of the set of ferrite strips; and
   control an amount of power coupling between the wireless power-transfer structure and a vehicle power-transfer structure of a dynamic wireless electric vehicle charging system.

12. The wireless power-transfer structure as described in claim 1, wherein the set of ferrite strips are arranged in the staggered pattern to define a magnetic size of the wireless power-transfer structure effective to control magnetic field emissions associated with the one or more coils.

13. The wireless power-transfer structure as described in claim 1, wherein the set of ferrite strips are arranged in the staggered pattern with a defined starting-point location for each strip of the set of ferrite strips effective to define a coupling range for coupling with a vehicle power-transfer structure and a range limit for associated magnetic field emissions of the magnetic field.

14. The wireless power-transfer structure as described in claim 1, further comprising a non-conductive component disposed between ending-point locations of the first plurality of ferrite strips and the second side.

15. The wireless power-transfer structure as described in claim 1, wherein each ferrite strip of the set of ferrite strips is disposed within a slot of a housing.

16. The wireless power-transfer structure as described in claim 1, wherein the one or more coils include a first coil and a second coil that is substantially coplanar with the first coil and positioned adjacent to the first coil.

17. A power-transfer apparatus comprising:
   a coil layer configured to generate a magnetic field based on an electrical current running through the coil layer; and
   a ferrite layer coupled to the coil layer and configured to provide a path for magnetic flux of the magnetic field, the ferrite layer including a series of ferrite strips having varying lengths, the series of ferrite strips having a starting-point location of each successive ferrite strip from an outer ferrite strip to an inner ferrite strip alternating at opposing first and second sides of the ferrite layer, the series of ferrite strips including a first plurality of ferrite strips extending from the first side of the ferrite layer, the series of ferrite strips including a second plurality of ferrite strips extending from the second side of the ferrite layer, at least one of the first plurality of ferrite strips having a different length than at least one other ferrite strip of the first plurality of ferrite strips, at least one of the second plurality of ferrite strips having a different length than at least one other ferrite strip of the second plurality of ferrite strips, each successive ferrite strip of the series of ferrite strips formed from a plurality of ferrite bars and having a length that is greater than a width of a coil boundary defined by a perimeter of one or more coils in the coil layer such that opposing sides of the coil boundary of the one or more coils are between the starting-point location and an ending-point location of each successive ferrite strip.

18. The power-transfer apparatus as described in claim 17, wherein the length of a respective ferrite strip of the series of ferrite strips is based on an accumulation of lengthwise dimensional tolerances of the ferrite bars that form the respective ferrite strip.

19. The power-transfer apparatus as described in claim 18, wherein:
the outer ferrite strip includes a first defined starting-point location at the first side of the ferrite layer; and
the inner ferrite strip is adjacent to the outer strip and includes a second defined starting-point location at the second side of the ferrite layer.

20. The power-transfer apparatus as described in claim 17, wherein the starting-point location of each successive ferrite strip in the series of ferrite strips is configured to define a coupling range for coupling with a power-transfer structure of a vehicle electric wireless charging system.

21. The power-transfer apparatus as described in claim 17, wherein the starting-point location of each successive ferrite strip in the series of ferrite strips is configured to control variations in output power that result from lengthwise dimensional tolerances in ferrite bars that form each ferrite strip.

22. The power-transfer apparatus as described in claim 17, wherein the starting-point location of each successive ferrite strip in the series of ferrite strips is configured to define a range limit for emissions of the magnetic field.

23. The power-transfer apparatus as described in claim 17, wherein the starting-point location of each successive ferrite strip in the series of ferrite strips is configured to:
decouple extremities of the ferrite layer from tolerances of ferrite bars that form each ferrite strip; and
control an amount of power coupling between the apparatus and a vehicle power-transfer structure of a wireless electric vehicle charging system.

24. A method for building a power-transfer structure that mitigates dimensional-tolerance effects on performance, the method comprising:
forming a first plurality of ferrite strips of the power-transfer structure, at least two of the ferrite strips of the first plurality of ferrite strips having varying lengths one to another, a respective first ferrite strip of the first plurality of ferrite strips formed based on a first subset of a plurality of ferrite bars disposed along a first longitudinal axis of the respective first ferrite strip, the respective first ferrite strip extending from a first side of the power-transfer structure and ending at a first ending-point location based on an accumulation of lengthwise dimensional tolerances of the first subset of ferrite bars;
forming a second plurality of ferrite strips of the power-transfer structure, at least two of the ferrite strips of the second plurality of ferrite strips having varying lengths one to another, a respective second ferrite strip of the second plurality of ferrite strips formed based on a second subset of the plurality of ferrite bars disposed along a second longitudinal axis of the respective second ferrite strip, the second subset having a same number of multiple ferrite bars as the first subset, the respective second ferrite strip extending from a second side of the power-transfer structure that is opposite the first side and ending at a second ending-point location that is based on an accumulation of lengthwise dimensional tolerances of the second subset of ferrite bars; and
building the power-transfer structure based on at least the first plurality of ferrite strips and the second plurality of ferrite strips to provide a path for magnetic flux of a magnetic field, the power-transfer structure including one or more coils to generate a magnetic field, the respective first ferrite strip and the respective second ferrite strip each having a length that is greater than a width of a coil boundary defined by a perimeter of the one or more coils such that the coil boundary is between the first ending-point location of the respective first ferrite strip and the second ending-point location of the respective second ferrite strip.

25. The method as described in claim 24, wherein a first ferrite strip of the first plurality of ferrite strips has a first length that differs from a second length of a second ferrite strip of the first plurality of ferrite strips based on a first accumulation of lengthwise dimensional tolerances of a subset of ferrite bars forming the first ferrite strip being different from a second accumulation of dimensional tolerances of another subset of ferrite bars that form the second ferrite strip.

26. The method as described in claim 24, wherein a first ferrite strip of the second plurality of ferrite strips has a first length that differs from a second length of a second ferrite strip of the second plurality of ferrite strips based on a first accumulation of lengthwise dimensional tolerances of a subset of ferrite bars forming the first ferrite strip being different from a second accumulation of dimensional tolerances of another subset of ferrite bars that form the second ferrite strip.

27. The method as described in claim 24, wherein the power-transfer structure is built at least by placing the plurality of ferrite bars into slots of a housing, each slot having a slot length that is greater than a corresponding ferrite strip placed in the slot.

28. The method as described in claim 24, wherein building the power-transfer structure includes inserting a non-conductive material:
between the first ending-point location of the respective first ferrite strip and the second side of the power-transfer structure to cause a compression force to be applied to the first subset of the plurality of ferrite bars forming the respective first ferrite strip; or
between the second ending-point location of the respective second ferrite strip and the first side of the power-transfer structure to cause a compression force to be applied to the second subset of the plurality of ferrite bars forming the respective second ferrite strip.

29. A wireless power-transfer apparatus, comprising:
one or more coils configured to generate a magnetic field based on an electrical current running through the one or more coils; and
a channeling means for channeling magnetic flux induced by the magnetic field, the channeling means comprising elements arranged in a staggered pattern including a first plurality of ferrite strips extending from a first side and a second plurality of ferrite strips extending from a second side, the second plurality of ferrite strips interleaving with the first plurality of ferrite strips, at least two ferrite strips of the first plurality of ferrite strips having varying lengths one to another, at least two ferrite strips of the second plurality of ferrite strips having varying lengths one to another, respective ferrite strips of the first plurality of ferrite strips and the second plurality of ferrite strips each having a length that is greater than a width of a coil boundary defined by a perimeter of the one or more coils, the coil boundary of the one or more coils being between a starting point and an ending point of a respective element.

* * * * *